Figure 3:
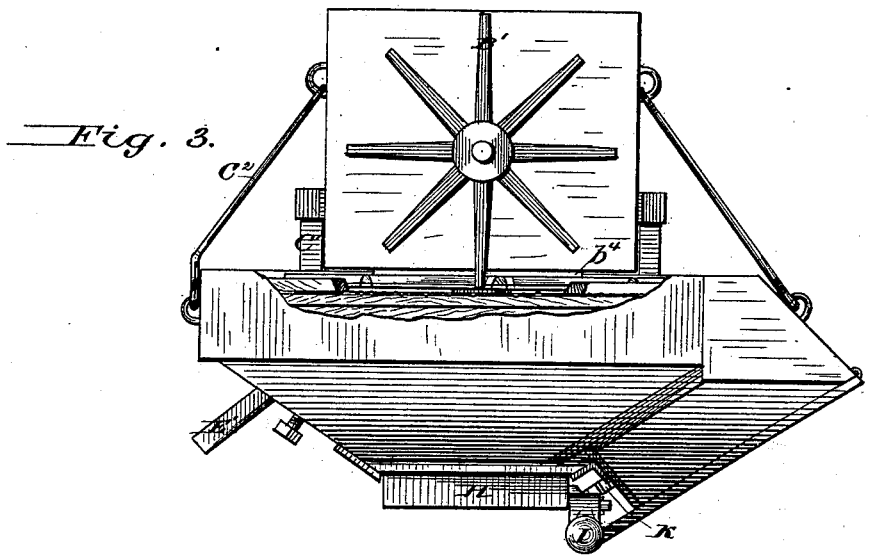

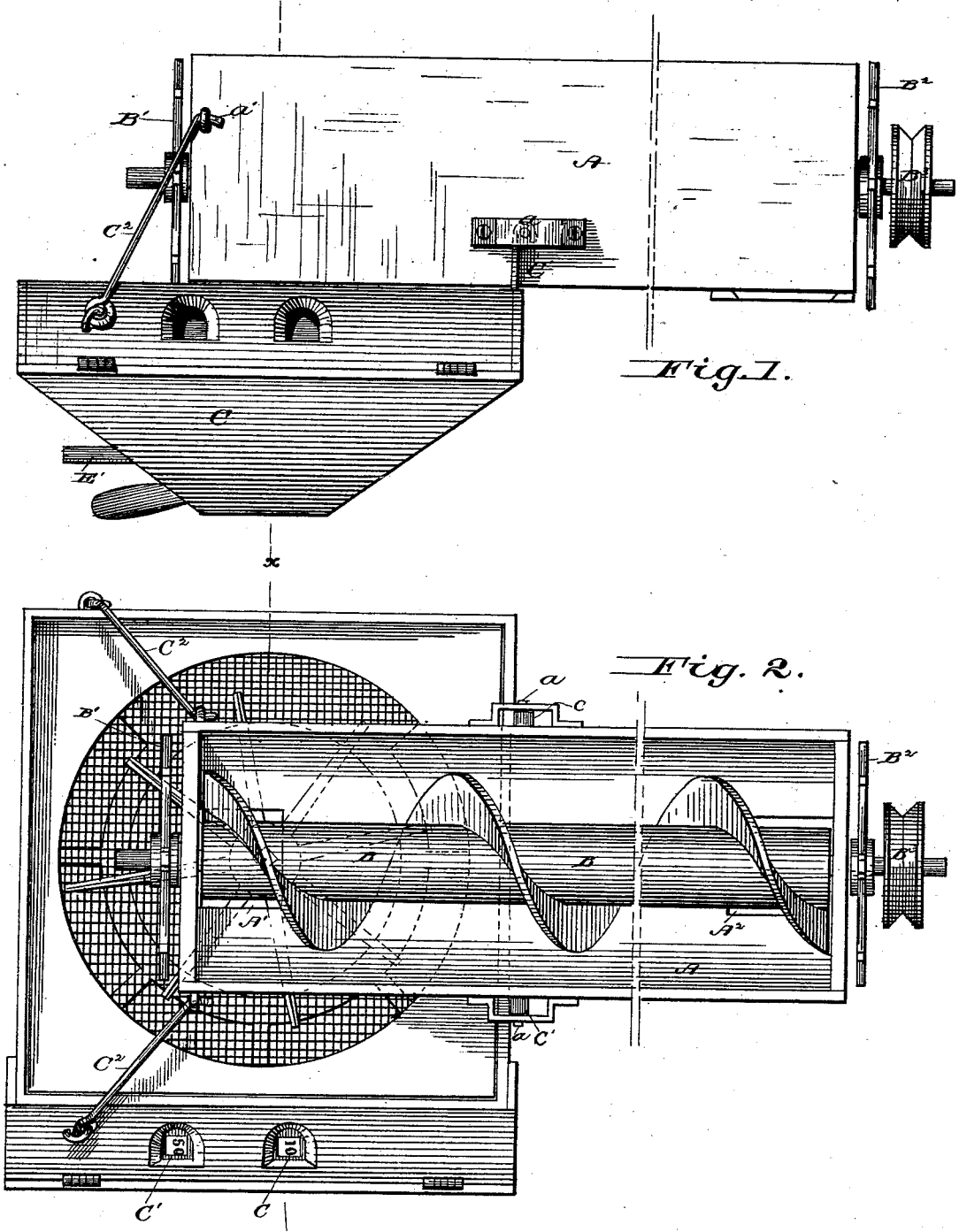

4 Sheets—Sheet 2

D. GEISER.
Grain and Seed Separator.

No. 225,696. Patented Mar. 23, 1880.

Attest:
H. L. Perrine
A. M. Long

Daniel Geiser,
Inventor.

By H. J. Abbot,
Atty.

D. GEISER.
Grain and Seed Separator.

No. 225,696. Patented Mar. 23, 1880.

Attest:
H. L. Pennie
N. M. Long

Daniel Geiser,
Inventor
By H. S. Abbot
Atty.

4 Sheets—Sheet 4
D. GEISER.
Grain and Seed Separator.
No. 225,696. Patented Mar. 23, 1880.
Fig. 7.
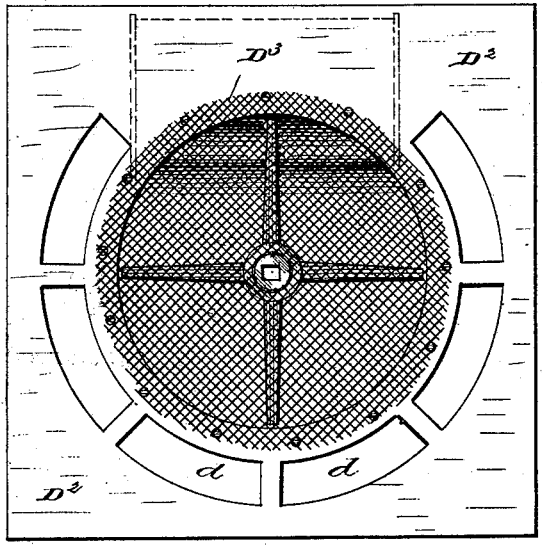
Fig. 8.
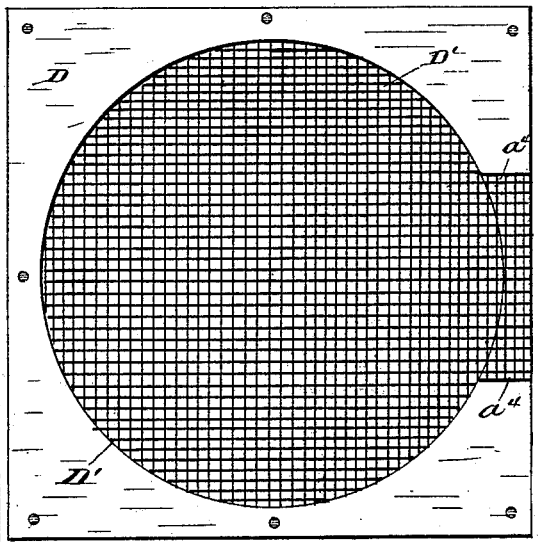
Fig. 9.
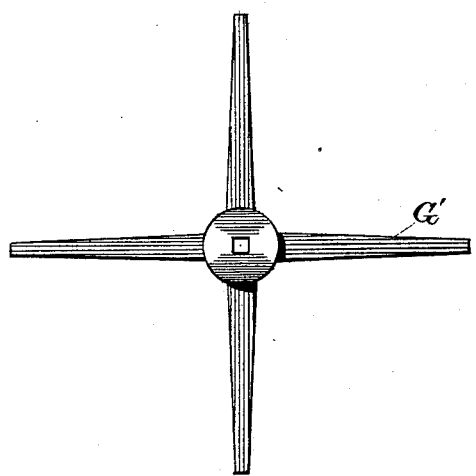
Fig. 10.
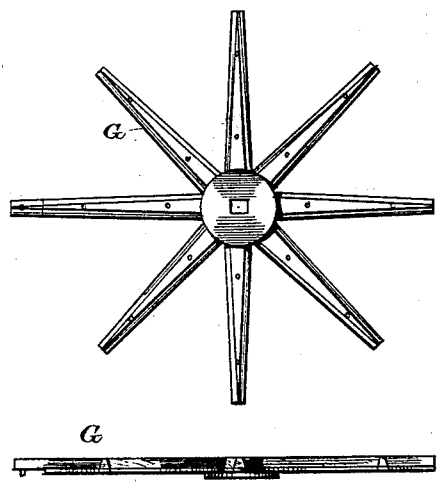
Fig. 11.
Daniel Geiser
Inventor.
Attest:
H. L. Perrine
A. M. Long
By H. T. Abbot
Atty.

UNITED STATES PATENT OFFICE.

DANIEL GEISER, OF WAYNESBOROUGH, PENNSYLVANIA.

GRAIN AND SEED SEPARATOR.

SPECIFICATION forming part of Letters Patent No. 225,696, dated March 23, 1880.

Application filed May 28, 1879.

*To all whom it may concern:*

Be it known that I, DANIEL GEISER, of Waynesborough, in the county of Franklin and State of Pennsylvania, have invented certain new and useful Improvements in Grain and Seed Separators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to an apparatus for cleaning and separating wheat and other grain from sticks, straws, seeds of grass or weeds, and all kinds of foreign matter or filth, the apparatus being intended more particularly as an attachment to grain thrashers and separators, so that the grain, after it has passed therethrough, is perfectly clean and fit for market without having to be run through a hand-windmill.

The invention consists in the combination, with a series of riddles or separating-sieves, of a series of reels with radial arms, which serve to distribute the material equally, and, by working the coarse particles to the edge or rim of the riddle, to separate it from the finer particles, which pass through the meshes thereof; also, in the combination, with a suitable hopper, of a number or series of riddles, each with its reel, the meshes of said riddles or sieves being of different sizes; and in the particular combination and arrangement of parts, as hereinafter more fully set forth.

The grain from the thrashing-machine is received in a trough or channel, in which a screw-conveyer revolves, and to this trough a hopper containing the riddles or separating-sieves is detachably secured, so that it may be placed at either end, the motion of the conveyer being changed as required.

The grain from the receiving-trough is delivered on a riddle or sieve the meshes of which are of such size that the grain is allowed to pass through, while all large or coarse filth, as sticks, straws, &c., is retained. The grain is next cleaned of finer foreign matters by means of a riddle with fine meshes, which permits the fine material to pass through, but retains the large grain.

A series of reels with radial arms revolve over and between the riddle, keeping its surface clear and working the material which does not pass through the meshes to the rim; whence it is carried off by hoppers or otherwise. The reels receive motion from the shaft of the screw-conveyer, and the riddles are readily detachable, so that others may be substituted, according to the particular grain or seed—say grass or clover—which it is desired to clean.

The following description will enable those skilled in the art to make and use my invention, reference being had to the accompanying drawings, in which—

Figure 4:
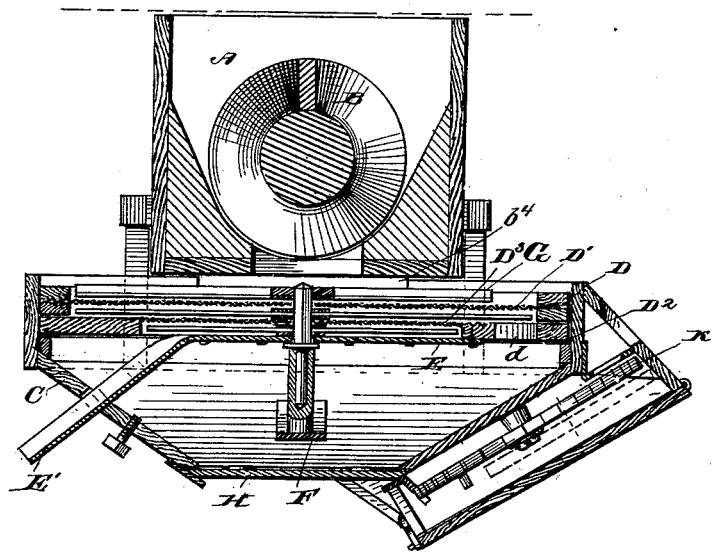
Figure 5:
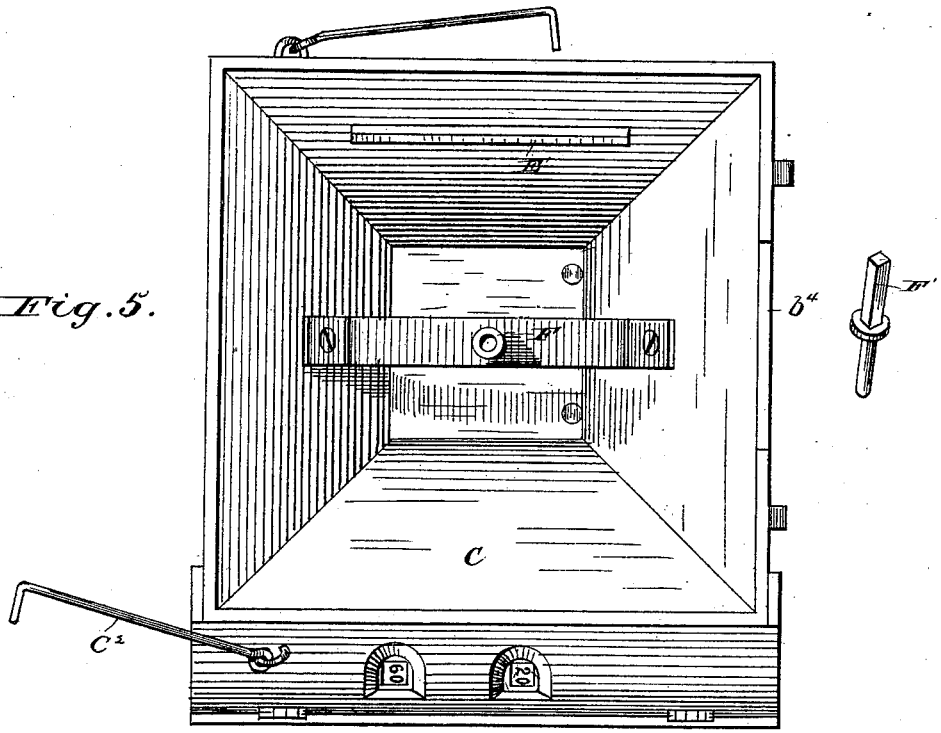
Figure 6:
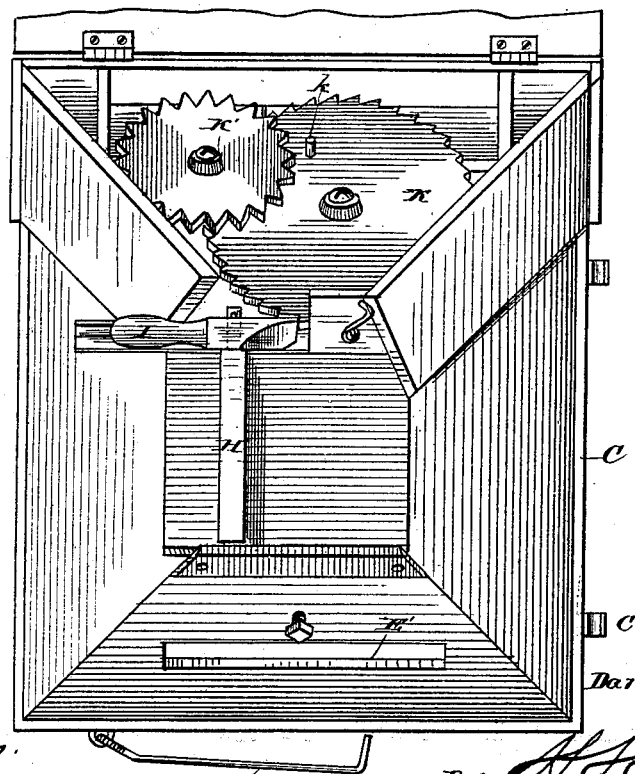

Figure 1 is a side elevation of a cleaner and separator made in accordance therewith; Fig. 2, a plan; Fig. 3, an end elevation, partly in section; Fig. 4, a section on line $xx$ of Fig. 2; Fig. 5, a top view of the hopper with the riddles and reels removed, showing the spindle on which the reels are placed detached; Fig. 6, a bottom view of the hopper, showing the registering apparatus; and Figs. 7, 8, 9, 10, and 11, detail views.

A represents a receiving-trough with a discharging-aperture, A' A², at both ends, and into it the grain from the thrasher is delivered after the chaff and other light material have been separated by the blast. It is to be secured beneath the thrasher and to be of such a length as to extend from side to side. In it the screw-conveyer B turns, being journaled in the ends of the trough. On the projecting ends of the conveyer-shaft are secured spoke-wheels B' B², and also at one end a pulley, B³, by which motion is imparted to the conveyer.

C is a hopper attached to the receiving-trough by means of supporting-rods C', with hooked ends to fit over pins $a$ on the side of the trough A, and hinged braces C², the ends of which rest in eyes $a'$. One side of the hopper C is provided with an opening, $b^4$, which corresponds with an opening, $a^4$, in the frame D², for the exit of coarse stuff that does not pass through the riddle D'. In this hopper are placed the frames D D², on which the riddles or sieves D' D³ are fixed. In the frame D² there are a series of openings, $d$, just outside the edge of the sieve D³. On the bottom of the frame D² is secured a plate, E, having a spout, E', which projects outside the hopper, so that everything which passes through the sieve D³ is carried off thereby.

At the lower part of the hopper is a cross-bar carrying a step, F, in which a spindle, F′, turns. The upper part of this spindle is squared, and on it, above the plate E and riddles D′ D³, are placed a series of reels with radial arms G G′ G².

The arms of upper reel, G, correspond in number with the spokes of the wheels B′ B², by which they are engaged and revolved, the other reels, G′ G², being at the same time rotated through the spindle F′. The arms of the reel G are preferably constructed of wood and metal, as shown in detail in Figs. 10 and 11; but the others are preferably of metal held between two metal plates, as shown in Fig. 9.

At the bottom of the hopper C is a slide, H, which moves in suitable grooves. At one side of it is pivoted a click or pawl, I, which is weighted at one end, or it may be pressed downward by a spring. This pawl, each time that the slide H is moved inward to close the hopper, engages with and partially rotates a toothed disk, K. This disk has upon it a series of numbers, which are exposed to view through an opening, c, in the upper part of the hopper. Each complete revolution of the disk K partially revolves an additional toothed numbering-disk, K′, by means of a small pin, k. The numbers of the disk K′ are exposed to view *seriatim* through the aperture c′. Both disks are pivoted on the side of the hopper, and are suitably inclosed and protected.

The operation of the apparatus is as follows: The conveyer B being put in motion by a band on the pulley B³, the reels G G′ G² are rotated by the engagement of the spokes of the wheel B′ with the arms of the reel G. This revolves the spindle F′, and the centers of the reels G′ G² fitting over the squared portion of said spindle, they are carried with it.

The grain from the thrasher, the chaff, and other light stuff, having been blown off by the fan of the thrasher, are received in the trough A and delivered by the conveyer B, through the aperture A′, upon the sieve or riddle D′ at about the center. The arms of the reel G spread it equally and sweep all sticks, unbroken grain-heads, straws, or other coarse filth off at the sides. The grain and fine impurities pass through upon the riddle or sieve D³, which retains the grain to be cleaned, while the fine impurities pass through onto the plate E, from which they are passed off through the spout E′ by the reel G². The reel G′ works the grain over the edge of sieve D³, and it falls through into the bottom of the hopper, where it remains till the slide H is opened.

The sieve D′ is preferably somewhat larger than the sieve D³, so that any grain which may be carried toward the outer edge falls directly through the holes d into the bottom of the hopper. The finer impurities are not apt to be carried by the reel G beyond the circumference of the sieve D³.

When a sufficient quantity of grain has collected on the slide H the latter is opened, and when the bag, bushel, or other desired measure is filled, it is closed, thereby operating the registering-disks K K′, as before indicated.

It will be seen that the hopper C may be readily detached by unlocking the braces C² and removing the hooked ends of the supporting-rods C′ from the pin a, and secured by similar means at the other end of the receiving-trough. The conveyer will then be revolved in the opposite direction by crossing the band on the pulley B³, and the grain will be delivered through the opening A². The reels will be revolved by the spoked wheel B².

It will be seen, also, that riddles with finer or coarser sieves may be readily substituted when it is desired to clean different kinds of grain or seeds—say grass or clover seed.

Modifications may be made in the details. The invention is not limited to two riddles, as any desired number may be used; but some of the sieves should be finer and some coarser than the seed or grain to be cleaned.

Part of the advantages of the invention may be secured by using different means from those described for revolving the reels or for securing the hopper to the receiving-trough, or by a different arrangement of the reels; but the construction shown is deemed the best and most fully embodying the invention.

Having thus fully described my said invention, and the manner in which the same is or may be carried into effect, what I claim, and desire to secure by Letters Patent, is—

1. The combination, with the hopper of a grain-separator, of a series of riddles, each having an opening for the exit of stuff that does not pass through the riddles, and a corresponding number of reels with radial arms rotating thereover.

2. The combination, with a hopper, C, of the riddles or sieves D′ D³, the plate E, provided with a spout, E′, and the reels G G′ G², substantially as described.

3. The combination, with a series of riddles and reels arranged to rotate thereover, of a receiving-trough and conveyer arranged to deliver the grain or seed to be cleaned centrally on the upper of said riddles, substantially as described.

4. The combination, with the hopper C, of the step F, located in the bottom part thereof, the spindle F′, resting in said step, the frame D², with the riddle or sieve D³ and plate E attached thereto, the frame D, with its sieve D′, and the reels G G′ G², fitting over the upper part of said spindle, substantially as described, whereby the said riddle or sieves may be readily detached and replaced by others, as set forth.

5. The combination, with the riddles or sieves D′ D³, reels G G′, and spindle F′, of the conveyer B and spoked wheel carried by shaft thereof, and adapted to engage the arms of the reel G, substantially as described.

6. The combination, with the receiving-trough A, adapted to be secured beneath a thrashing-machine, and having openings A' A², and spoked wheels B' B² at opposite ends of a hopper, C, having cleaning mechanism arranged within it, and means, C' C², for readily securing said hopper at either end of said trough, substantially as described.

7. The improved cleaning apparatus, substantially as herein described, consisting of, first, a receiving-trough, A; second, a conveyer, B; third, a spoked wheel, B', on the shaft of said conveyer; fourth, a hopper, C, secured detachably to said trough; fifth, a series of riddles, D' D³; sixth, a plate, E, with spout E', secured beneath the finest of said riddles; and, seventh, a series of reels, G G' G², turning on, eighth, a spindle, F', substantially as described.

In testimony that I claim the foregoing I have hereunto set my hand this 26th day of May, 1879.

DANIEL GEISER.

Witnesses:
M. A. FLAUTT,
S. H. WADDELL.